United States Patent [19]
Gleim et al.

[11] Patent Number: 6,002,225
[45] Date of Patent: Dec. 14, 1999

[54] METHOD FOR THE CONTROL OF A MOTOR

[75] Inventors: Günter Gleim; Hermann Link, both of Villingen-Schwenningen, Germany; Michael Bildl, Mount Rosie Garden, Singapore; Friedrich Heizmann, Villingen-Schwenningen, Germany

[73] Assignee: Deutsche Thomson-Brandt GmbH, Villingen-Schwenningen, Germany

[21] Appl. No.: 08/744,686

[22] Filed: Nov. 7, 1996

Related U.S. Application Data

[63] Continuation of application No. 08/345,012, Nov. 23, 1994, abandoned, which is a continuation of application No. 08/104,530, Aug. 12, 1993, abandoned.

[30] Foreign Application Priority Data

Aug. 20, 1992 [DE] Germany ............................. 42 26 934

[51] Int. Cl.⁶ ...................................................... H02P 3/10
[52] U.S. Cl. ............................. 318/373; 318/293; 388/84; 388/819
[58] Field of Search .................................. 310/362–382, 310/280–300; 388/800–824

[56] References Cited

U.S. PATENT DOCUMENTS

| | | | |
|---|---|---|---|
| 3,710,216 | 1/1973 | Smith | 318/373 |
| 3,753,077 | 8/1973 | Anderson et al. | 318/345 |
| 3,777,237 | 12/1973 | Anderson | 318/345 |
| 4,146,827 | 3/1979 | Krohn | 388/811 |
| 4,423,363 | 12/1983 | Clark et al. | 318/376 X |
| 4,449,082 | 5/1984 | Webster | 318/618 |
| 4,568,863 | 2/1986 | Ruof | 318/269 |
| 4,705,997 | 11/1987 | Juzswik | 318/293 X |
| 4,763,049 | 8/1988 | Magee | 318/254 |
| 4,816,726 | 3/1989 | Novis et al. | 318/293 |
| 5,010,283 | 4/1991 | Kitajima et al. | 318/373 |
| 5,086,261 | 2/1992 | Sakata et al. | 388/811 X |
| 5,313,548 | 5/1994 | Arvidson et al. | 388/800 |

FOREIGN PATENT DOCUMENTS

| | | | |
|---|---|---|---|
| 0 352 728 | 1/1990 | European Pat. Off. | H02P 3/10 |
| 35 00 711 | 7/1986 | Germany | H02M 3/10 |
| 36 37 786 | 5/1988 | Germany | H02P 29/00 |
| 2 083 304 | 3/1982 | United Kingdom | G11B 15/22 |

*Primary Examiner*—David Martin
*Attorney, Agent, or Firm*—Joseph S. Tripoli; Peter M. Emanuel; Frederick A. Wein

[57] ABSTRACT

A method of breaking a motor includes the step of applying a pulse width modulated signal to the winding of the motor. A switching voltage is used to intermittently reverse the poles of the motor for selected time periods. The time periods are separated by pauses the duration of which is dependent upon the breaking force needed to stop the motor.

6 Claims, 3 Drawing Sheets

A) $IM = -\dfrac{P \cdot UB}{RM} + \dfrac{UG}{RM}$  $\qquad IM = \dfrac{P \cdot UB}{RM} + \dfrac{UG}{RM}$ B) $P = 0 : IM = \dfrac{UG}{RM}$  $\qquad IM = \dfrac{UG}{RM}$ C) $P = \dfrac{UG}{UB} : IM = 0$  $\qquad IM = 2 \cdot \dfrac{UG}{RM}$ D) $P = 2\dfrac{UG}{UB} : IM = -\dfrac{UG}{RM}$  $\qquad IM = 3 \cdot \dfrac{UG}{RM}$ E) $P = 1 : IM = -\dfrac{UB}{RM} + \dfrac{UG}{RM}$  $\qquad IM = \dfrac{UB}{RM} + \dfrac{UG}{RM}$ ns to motor windings are reversed and the motor is
METHOD FOR THE CONTROL OF A MOTOR This is a continuation of application Ser. No. 08/345,012, filed Nov. 23, 1994, now abandoned, which is a continuation of Ser. No. 08/104,530, filed Aug. 12, 1993, now abandoned.

This invention is directed to a method of controlling a motor, and in particular to changing the direction of rotation.

BACKGROUND OF THE INVENTION

It is known to feed motors with a pulse width modulated voltage of constant amplitude, wherein the pulse width modulation (PWM) determines the prevailing torque or the rotational speed, instead of using a constant amplitude direct voltage. This operation is also known as chopper mode. The frequency of the pulse width modulated pulses is above the audible range to avoid the motor control being audible and also to ensure that, despite the pulsed control, a practically direct current, the magnitude of which is determined by the PWM, flows in the winding of the motor due to the integrating effect.

In a known method of initiating the braking of a motor or to change the direction of rotation, the polarity of the voltages to motor windings are reversed and the motor is suddenly driven in the opposite direction of rotation. Under these conditions, initially the motor continues to run in the former direction of rotation, is braked to zero, and then rotates in the opposite direction of rotation. The following difficulties arise with this type of braking. The ends of the motor windings are connected to the operating voltage or to ground via protective diodes. The diodes protect the connected semiconductor components from destruction by voltage peaks generated in the motor windings. When a motor winding is reverse poled at the beginning of braking, a high current, which is produced by the generator voltage or the EMF generated by the motor and the resistance of the motor winding, flows independently of the control action due to conduction in the protection diodes. This current acts as a braking current due to the rotation of the motor i.e. due to the relative movement between the motor windings and the permanent magnets. Since this current cannot fall below the rated value, the braking effect can, in many cases, be too great. For example, in a video recorder, the capstan motor may be considered as the tape drive or tape advancing mechanism. Hence, if the capstan motor is braked too rapidly, loops of magnetic tape can be formed due to the inertia of the feed spool which may continue to turn.

SUMMARY OF THE INVENTION

It is an object of the invention to provide a method of controlling a motor using pulse width modulated control which makes possible a defined braking effect. With the invention, motor braking is not carried out by the static reversal of the motor winding, Instead there is an intermittent reversal of the motor winding. During a period, which is preferably equal to the period of the pulse width modulated voltage, the reversal of the poles of the winding occurs during a first part of the period, while the reversal of the poles is canceled for the remaining part of the period. By selection of the pulse/pause ratio for the intermittent reversal of the poles of the winding, the braking effect can be altered within wide limits. Alteration of the frequency or amplitude of the actual pulse width modulated operating voltage for the motor is not required.

Preferably, a first control variable which indicates the nominal direction of rotation, and a second control variable which indicates the actual direction of rotation, are compared and a third control variable which occurs upon any change initiates intermittent reversal of the poles of the winding. The ratio of the duration of reversal of the poles to the total period of the intermittent reversal of the poles is preferably variable between the values 0 to 1. The pulse width modulated pulses and the switching voltage for the intermittent reversal of the poles are preferably derived from the same pulse voltage. For equality between the nominal and the actual direction of rotation, the motor is only fed by the pulse width modulated pulses in the sense of a constant direction of rotations and for non-equality between the nominal and the actual direction of rotation, the motor is fed alternately in the sense of an opposed direction of rotation. The second control variable which indicates the actual direction of rotation, is preferably determined by sensors associated with the motor. The information regarding the desired braking effect is preferably derived via sensors of the motor and/or from items of data typical to the motor.

BRIEF DESCRIPTION OF THE DRAWING

The invention is described with reference to the FIGURES in which.

In the description and FIGURES the symbols used have the following meanings:

UB=constant operating voltage for the motor

UG=the EMF induced in the motor winding

IM=the current flowing through the motor

RM=resistance of the motor winding

T=the period of the pulse width modulated voltage and the intermittent reversal of the poles $t_{on}$=duration of the reversal of the poles during the period of the intermittent reversal of the poles P=$t_{on}$/T

DETAILED DESCRIPTION

Figure 1:
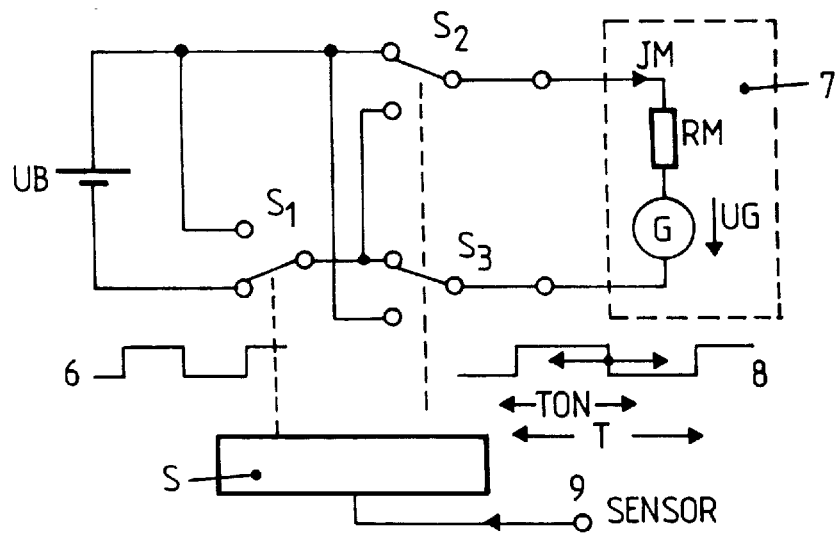
FIG. 1 shows a basic wiring diagram for a motor control system employing the inventive method.

In FIG. 1, the operating voltage UB is converted by the switch S1 into a pulse width modulated pulse voltage. Switch S1 is actuated by the control circuit S by means of the pulse width modulated pulse switching control voltage 6. Switching control voltage 6 is responsive to the signal present at terminal "e" of logic circuit 5. The resulting pulse width modulated pulse voltage produced at the output side of switch S1 is coupled to the motor 7 via change over switches S2 and S3. Motor 7 is shown as including a generator G, which provides the induced voltage UG or EMF, and the resistance of the motor winding RM. To start the braking of motor 7 the positions of switches S2 and S3 are changed by the control circuit S. Thus the winding of the motor 7 is reverse poled relative to the input voltage UB. The reversal of the poles need not always occur statically but can also be intermittent in accordance with the invention, as is illustrated by the switching control voltage 8. Switching control voltage 8 is controlled responsive to the signal at terminal "d" of logic circuit 5. The duration $t_{on}$ of the reversal of the poles by the switches S2, S3 relative to the period T of the intermittent reversal of the poles determines the moment of braking. The value of $t_{on}$, and thus the moment of braking, are determined by a control circuit S. Control circuit S receives, via terminal 9, additional information from sensors regarding mechanical or electrical motor values.

Figure 2:
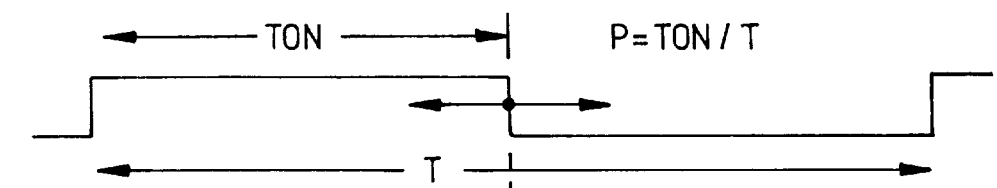
FIG. 2 is a diagram of the currents arising from the intermittent reversal of the poles with different pulse/pause ratios.

By means of the equations shown in FIG. 2, it is explained how a desired braking effect is achievable by alteration of the duty ratio $P=t_{on}/T$. Equation A indicates the motor current IM, occurring during the time $t_{on}$ and the succeeding pause time $T-t_{on}$. The equation A is thus generally applicable. Equation A may be evaluated to determine the limiting conditions of motor current control with variation of duty ratio P. Since the duty ratio P may have values between 0 and 1, these limit conditions are substituted in equation A and result in equations B and E. Equation B indicates the current resulting from a first limiting value condition where P=0. Equation C indicates the current resulting for a specific duty ratio value where P=UG/UB. Equation D indicates the current resulting for another duty ratio value where P=2UG/UB. Equation E indicates the current resulting for the other limiting duty ratio value where P=1. Since the current IM is integrated over the total period T, the current value integrated over the times $t_{on}$ and $T-t_{on}$ is in each case decisive for the braking effect. It is apparent that this value may be very small or even zero for certain values between P=0 (equation B) and P=1 (equation E). If for example, the negative expression in the equations=UG/RM, the integrated current value is practically zero. Consequently, by selection of P between 0 and 1, i.e., between absolutely no resulting reversal of the poles, when P=0 and continuous reversal of the poles when P=1, the desired braking effect can be set.

Figure 3:
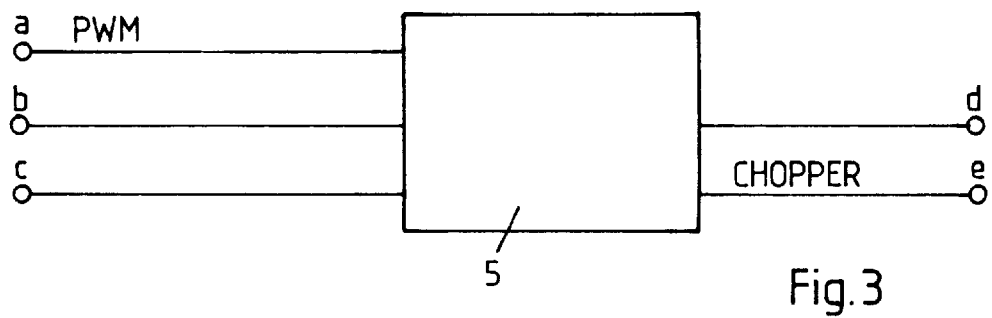
FIG. 3 is a basic block diagram of a portion of the motor control system shown in FIG. 1 and employing the inventive method.

FIG. 3 depicts a simplified block diagram for the realization of the method in accordance with the invention. A logic circuit 5 which has three input terminals, a, b and c is illustrated. The pulse width modulated pulse voltage, which is present on the output terminal of switch S1 in FIG. 1, is supplied to the input terminal a. The first control variable, which indicates the nominal direction of the rotation, is supplied to the input terminal b and the second control variable, which indicates the actual direction of rotation, is supplied to the input terminal c. Logic circuit 5 has two output terminals d and e. The signal on the output terminal d controls the reversal of the poles of the winding by the switches S2 and S3. The signal on output terminal e carries the actual pulse width modulated voltage, as shown on the output terminal of switch S1 in FIG. 1.

Figure 4:
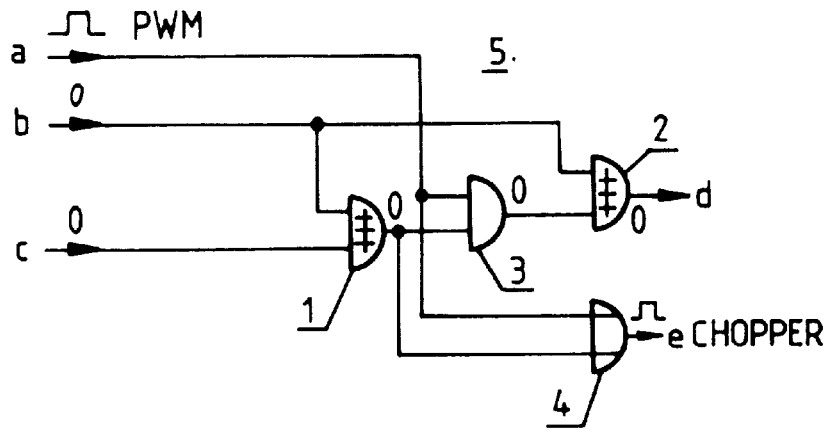
FIGS. 4–11 show a logic circuit embodying the portion of the motor control system shown in FIG. 3 and operational voltages for various operational states, or modes.
Figure 5:
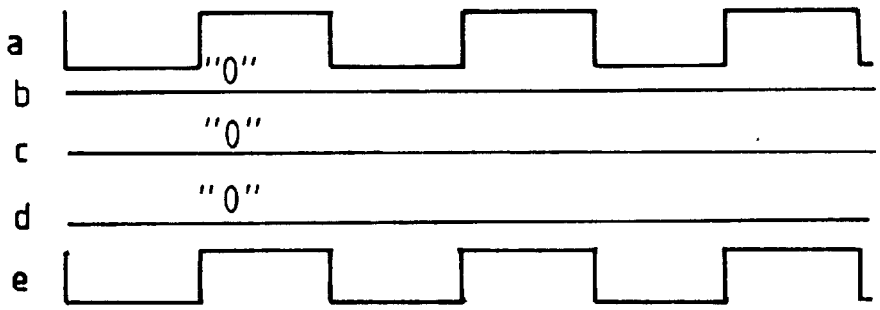

In the FIGS. 4–11, the letters a–e indicate [which of] the voltages shown in FIGS. 5, 7, 9 and 11 present on the corresponding input terminals a, b and c and output terminals d and e in the respective FIGS. 4, 6, 8, 10. FIGS. 4, 6, 8 and 10 show one possible arrangement of logic circuit 5 shown in FIG. 3. Logic circuit 5 contains a first EXOR gate 1, a second EXOR gate 2, an AND gate 3 and an OR gate 4. FIG. 4 applies to the case where the nominal direction of rotation and the actual direction of rotation are the same i.e. both control variables at the input terminals b and c have the value 0, as is shown in FIG. 5. The value 0 then appears at the output terminal d and, as desired the direction of rotation is not changed. The actual pulse width modulated voltage which is applied to the motor is present on the output terminal e. This is the case where the motor runs in its nominal direction of rotation and thus reversal of the poles of a winding should not occur.

Figure 6:
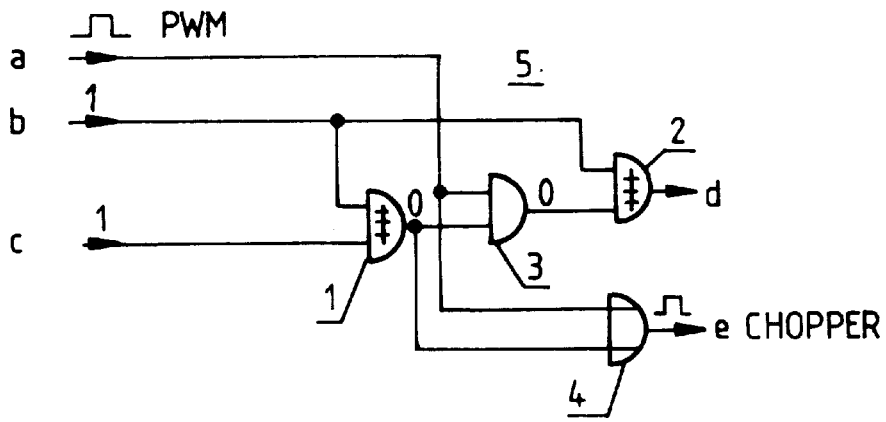
Figure 7:
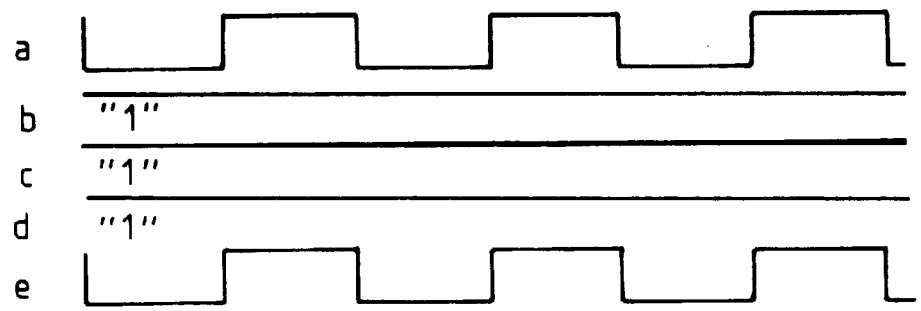

FIGS. 6 and 7 show the same conditions for static operation with equal high voltages on terminals b and c for the nominal direction and actual direction of rotation but for the direction opposite to that of FIGS. 4 and 5.

Figure 8:
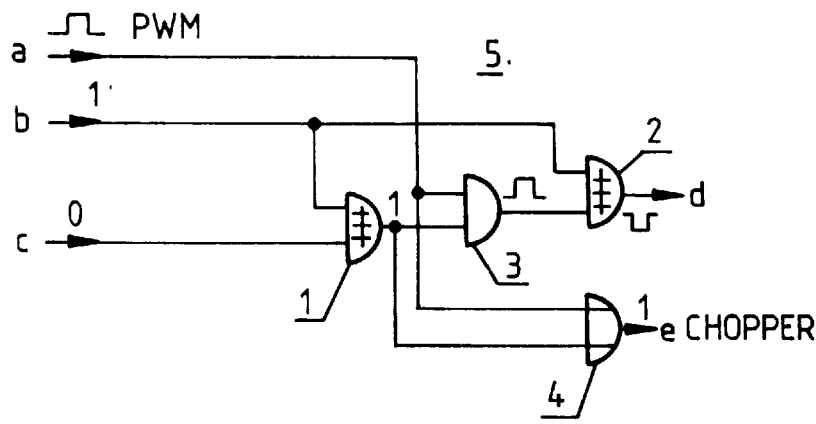
Figure 9:
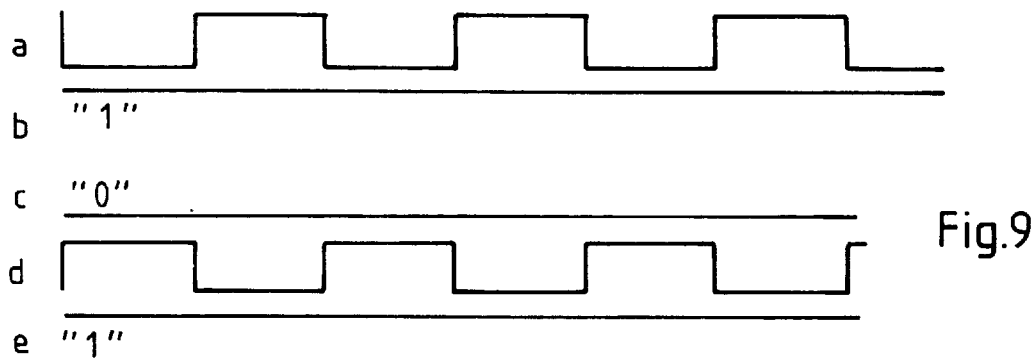

FIGS. 8 and 9 illustrate a case where the control variable on the input terminal b for the nominal direction of rotation, and the control variable on the input terminal c for the actual direction of rotation are different. The output terminal e, which receives the pulse width modulated voltage in FIGS. 4–7 remains high (at 1). Initially, this means, that the full operating voltage UB is continuously present at the output terminal of S1 in FIG. 1. The output terminal d which controls the reversal of the poles of the motor winding, now corresponds to the pulse width modulated voltage at input terminal a. This means, that the motor winding is now intermittently reverse poled in correspondence with the value P shown in FIG. 2.

Figure 10:
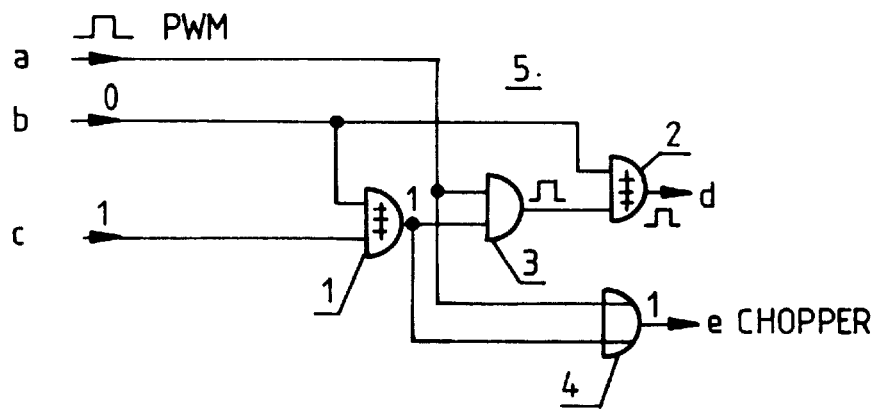
Figure 11:
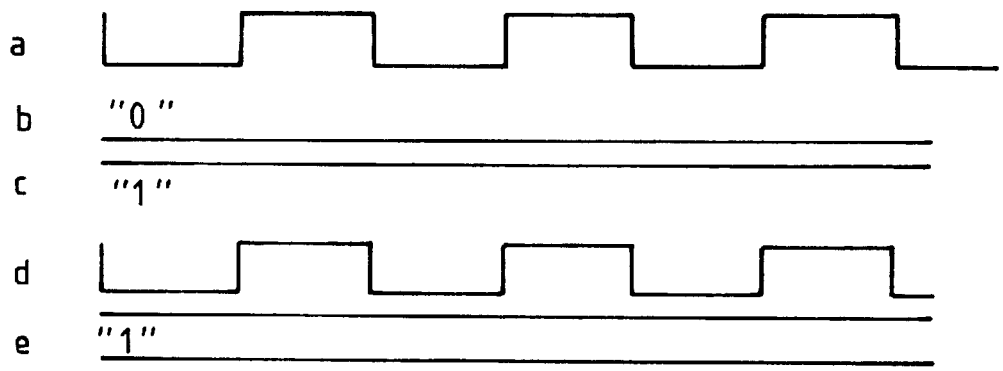

FIGS. 10 and 11 are the same as FIGS. 8 and 9 except that voltages on terminals b and c are reversed. The effect is therefore similar to FIGS. 8 and 9 with the difference that the pulse voltage on the output terminal d, which causes the reversal of the poles of the motor, is rotated 180° relative to FIG. 9. It is apparent that the pulse voltage feed to the motor and the pulse voltage which reverses the poles of the motor winding during braking are derived from the same input voltage on terminal a. The actual voltage continuously fed to the motor comes from the output terminal e of the circuit 5 while the voltage on output terminal d controls the reversal of the poles of the winding in cooperation with the switches S2 and S3 in FIG. 1.

We claim:

1. A method for the control of a DC motor that switchably alternates between two modes of operation, the method comprising:

(a) implementing a first control mode by pulse width modulating a power supply coupling to a winding of said motor and selecting a polarity of said power supply coupling;

(b) implementing a second control mode by pulse width modulating successive polarity reversals of a substantially constant power supply coupling to said winding of said motor; and (c) switching between said modes as desired based upon a nominal direction signal, an actual direction signal and a pulse width modulated signal.

2. The method of claim 1, comprising an additional step of:

during said first control mode controlling motor speed with PWM power.

3. The method of claim 1, further comprising the step of determining a direction of motor rotation by polarity of the power supply during the first control mode of operation.

4. The method of claim 1 further comprising the step of braking the rotational speed of said motor by PWM successive supply polarity reversals in said second control mode.

5. A method of claim 1, further comprising:

(1) selecting a first or a second position of a switch means for enabling rotation of said motor in first or second directions respectively; and, (2) supplying pulse width modulating power to said winding of said motor including said switch means, and changing said direction of rotation of the motor by pulse width modulating successive reply polarity reversals in said second control mode.

6. The method of claim 5, further comprising the step of: detecting a change in said direction of rotation.

* * * * *